United States Patent
Sengupta et al.

(10) Patent No.: US 9,996,707 B2
(45) Date of Patent: Jun. 12, 2018

(54) METHOD AND APPARATUS FOR DESTRUCTING COMPROMISED DEVICES

(71) Applicant: BAE SYSTEMS INFORMATION AND ELECTRONIC SYSTEMS INTEGRATION INC., Nashua, NH (US)

(72) Inventors: Louise C. Sengupta, Ellicott City, MD (US); Pierre-Alain S. Auroux, Rockville, MD (US); Don A. Harris, Columbia, MD (US); Myeongseob Kim, Ellicott City, MD (US); Tadd C. Kippeny, Pasadena, MD (US); Somnath Sengupta, Ellicott City, MD (US); Igor I. Smolyaninov, Columbia, MD (US); Laura A. Swafford, Baltimore, MD (US); Chen J. Zhang, Clarksville, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 6 days.

(21) Appl. No.: 15/223,181

(22) Filed: Jul. 29, 2016

(65) Prior Publication Data
US 2017/0032149 A1    Feb. 2, 2017

Related U.S. Application Data

(60) Provisional application No. 62/198,700, filed on Jul. 30, 2015.

(51) Int. Cl.
| | |
|---|---|
| *G06F 21/70* | (2013.01) |
| *C01B 33/02* | (2006.01) |
| *C01F 7/00* | (2006.01) |
| *G06F 21/75* | (2013.01) |

(52) U.S. Cl.
CPC ............. *G06F 21/70* (2013.01); *C01B 33/02* (2013.01); *G06F 21/75* (2013.01); *G06F 2221/2143* (2013.01)

(58) Field of Classification Search
CPC .. G06F 21/70; G06F 21/75; G06F 2221/2143; C01F 7/00; C01B 33/02
USPC ................................... 588/313–320
See application file for complete search history.

*Primary Examiner* — Daniel C McCracken
(74) *Attorney, Agent, or Firm* — Davis & Bujold, PLLC; Scott J. Asmus (57) ABSTRACT

The system and method for destroying compromised objects, including electronic devices. The system and method utilizes a barrier separating two reagents that can be rapidly mixed to form a base when desired. The system and method have a barrier configured to be triggered remotely. The barrier comprises an aluminum foil layer.

7 Claims, 8 Drawing Sheets

FIG. 1

| | MATERIAL | ROLE |
|---|---|---|
| MATERIAL | HYDROGEL A (i.e. AGAROSE HYDROGEL) | SALT LOADED HYDROGEL AS ELECTROLYTE |
| | HYDROGEL B (i.e. AMINO HYDROGEL) | pH SENSITIVE HYDEOGEL LIQUIFIES IN ALKALINE ENVIRONMENT PROVIDING WATER FOR CHEMICAL REACTION WITH HYDROXIDE SALT |
| | HYDRODE SALT (i.e.) KOH, CsOH) | BASE (OH⁻) SOURCE |
| | POLYMER A (i.e. PC6) | BASE SOLUBLE POLYMER BARRIER; ELECTRICAL INSULATOR |
| | POLYMER B (i.e. PVA) | WATER SOLUBLE POLYMER BARRIER |
| | Al FOIL | WATER BARRIER AND ANODE |
| | CATHODE | BASE GENERATION |
| | ANODE | ELECTROLYSIS |
| MECHANISM | TRANSIENCE MECHANISM | ELECTROLYSIS OF Al FOIL ANODE |
| | SHELF-LIFE MECHANISM | Al FOIL WATER IMPERMEABILITY |

| PROCESS COMPONENT | STANDARD CMOS | TRANSIENT BEOL | COMMENTS |
|---|---|---|---|
| METAL INTERCONNECT | ALUMINUM | ALUMINUM | DISSOLVES RAPIDLY IN BASIC SOLUTION |
| INTER-METAL DIELECTRIC | $SiO_2$ | AlN | AlN DISSOLVES RAPIDLY IN BASIC SOLUTION |
| ETCH STOPS FOR CONTACTS AND VIAS | $Si_3N_4$ | $Si_3N_4$-CONTACT Ru-METAL vias | $Si_3N_4$ DOES NOT DISSOLVE, BARRIER PATCHES ARE LESS THAN 0.85 μm ON A SIDE. Ru IS USED AS A SACRIFICIAL ETCH STOP AND DOES NOT REMAIN IN FINAL PRODUCT |
| CONTACT/VIA PLUGS | TUNGSTEN | TUNGSTEN | DOES NOT DISSOLVE BUT DIMENSIONS < 0.35 μm (ALUMINUM CONTACT/VIA FILL IS FEASIBLE OPTION IF DEEMED NECESSARY) |
| METAL EDGE SPACERS | NONE | $Si_3N_4$ | SiN DOES NOT DISSOLVE, BUT <0.5 μm AROUND METAL |

FIG. 8

ID
METHOD AND APPARATUS FOR DESTRUCTING COMPROMISED DEVICES

CROSS REFERENCE TO RELATED APPLICATIONS

This Application claims the benefit of U.S. Provisional Application No. 62/198,700, filed Jul. 30 2015, the contents of which are incorporated by reference herein in their entirety.

FIELD OF THE DISCLOSURE

The present disclosure relates to the security of electronic devices and more particularly to self-destructing sensors or other electronic devices. This disclosure details a novel packaging scheme which utilizes in-situ base generation to dissolve the packaged electronic component by rapidly exposing it to an alkaline environment.

BACKGROUND OF THE DISCLOSURE

There is a need to protect sensors and other electronic devices such as those used for national security applications. Such sensors or other electronic devices should be made tamper-proof so that they may not be reverse engineered by hostile agencies and/or other foreign or commercial entities. In addition, sensors or other electronic devices that have been made tamper-proof through anti-tamper technology could be approved for dual military and commercial use.

SUMMARY OF THE DISCLOSURE

One aspect of the present disclosure is a method of destroying compromised objects, comprising: providing an electronic device having electronic circuitry comprising thin silicon (Si), aluminum (Al) or aluminum nitride (AlN); providing a first reagent; providing a second reagent; providing a barrier between the first and second reagents, the barrier having a first reagent side and a second reagent side; triggering destruction of the barrier; generating a base by combining the first and second reagents; and dissolving at least a portion of the electronic circuitry in the electronic device thereby making electronic device unusable.

One embodiment of the method is wherein the step of triggering takes place remotely. One embodiment of the method is wherein the triggering mechanism is an electronic signal.

One embodiment of the method is wherein the first reagent is a hydrogel electrolyte and the second reagent is a hydroxide salt.

One embodiment of the method is wherein the barrier between the first and second reagents comprises a material stack comprising an aluminum foil and a base soluble, water barrier polymer.

One embodiment of the method is wherein the aluminum also acts as an anode, with the base soluble, water barrier polymer serving as an electrical insulator masking the aluminum anode on the first reagent side.

One embodiment of the method is wherein the step of triggering destruction of the barrier comprises applying a voltage causing aluminum ions to migrate from the aluminum anode to a cathode electrode, thereby rupturing the barrier between first reagent and the second reagent.

Another aspect of the present disclosure is method of packaging two reactants for in situ base generation, comprising: providing a first reagent; providing a second reagent; providing a barrier between the first and second reagents, the barrier having a first reagent side and a second reagent side; triggering destruction of the barrier; and generating a base by combining the first and second reagents.

One embodiment of the method is wherein the first reagent is a hydrogel electrolyte. One embodiment of the method is wherein the second reagent is a hydroxide salt.

One embodiment of the method is wherein the barrier between the first and second reagents comprises a material stack comprising an aluminum foil and a base soluble, water barrier polymer. One embodiment of the method is wherein the material stack further comprises a water soluble polymer.

One embodiment of the method is wherein the aluminum also acts as an anode, with the base soluble, water barrier polymer serving as an electrical insulator masking the aluminum anode on the first reagent side.

One embodiment of the method further comprises a cathode electrode also in contact with the first reagent, but electrically isolated from the anode aluminum barrier.

One embodiment of the method is wherein the step of triggering destruction of the barrier comprises applying a voltage causing aluminum ions to migrate from the aluminum anode to the cathode electrode, thereby rupturing the barrier between first reagent and the second reagent.

One embodiment of the method is wherein the first reagent is a hydrogel and the second reagent is a hydroxide salt for use in generating a base.

One embodiment of the method is wherein the generating a base step requires the triggering event and will otherwise remain in an unmixed state for an extended period of time.

Another aspect of the present disclosure is system of packaging reagents, comprising a first reagent layer; a second reagent layer; a barrier layer having a first reagent side and a second reagent side; and an encapsulant for containing the first reagent layer, the second reagent layer, and the barrier.

One embodiment of the method is wherein the barrier layer comprises an aluminum foil with a minimum thickness of 7 μm with no pinholes, and a base soluble, water barrier polymer.

One embodiment of the method is wherein the aluminum also acts as an anode, with the base soluble polymer serving as an electrical insulator masking the aluminum anode on the first reagent side.

One embodiment of the method further comprises a cathode for use in triggering the mixing of the first reagent and the second reagent remotely via destruction of the barrier layer.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
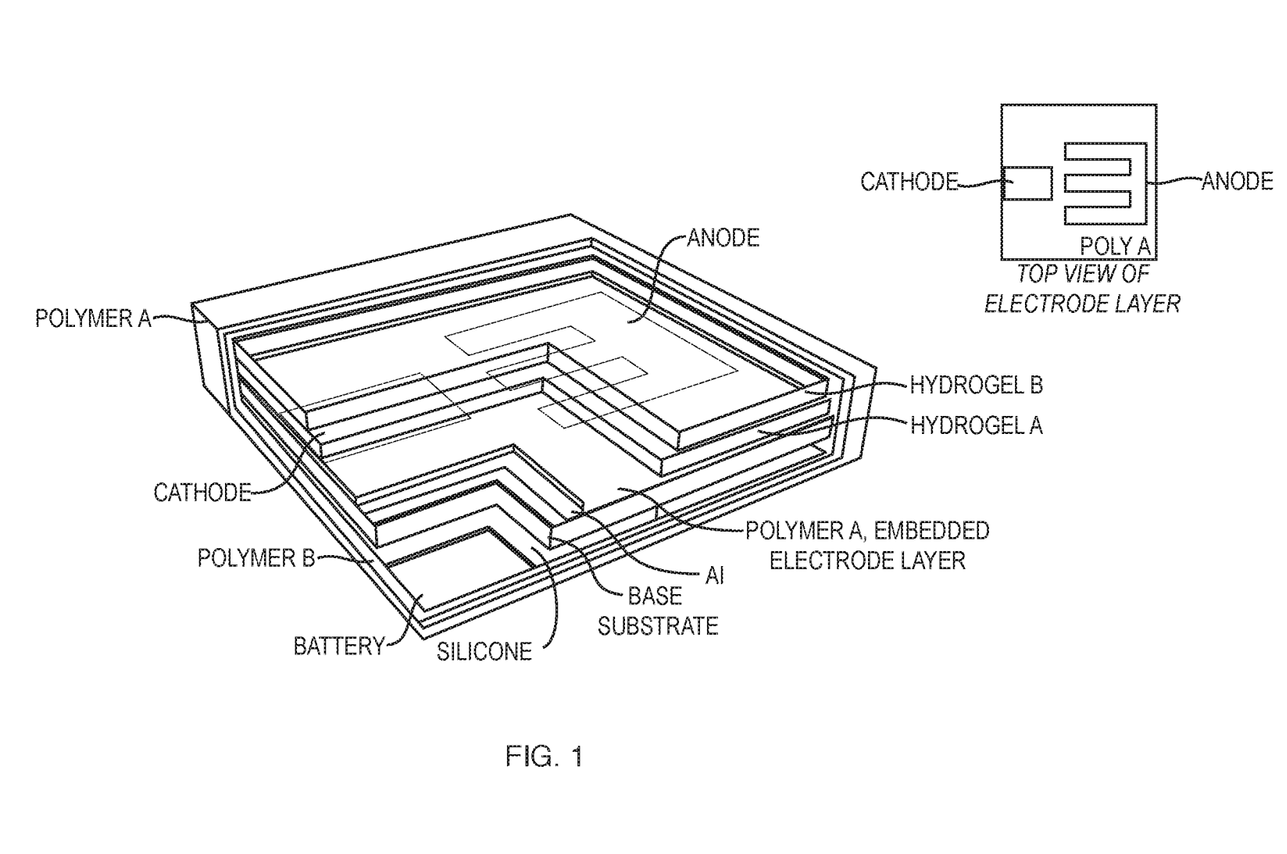
FIG. 1 shows one embodiment of a pH-sensitive Hydrogel with Alkaline Silicon Etching (referred to hereafter as "pHASE") transient sensor of the present disclosure.
Figure 2:
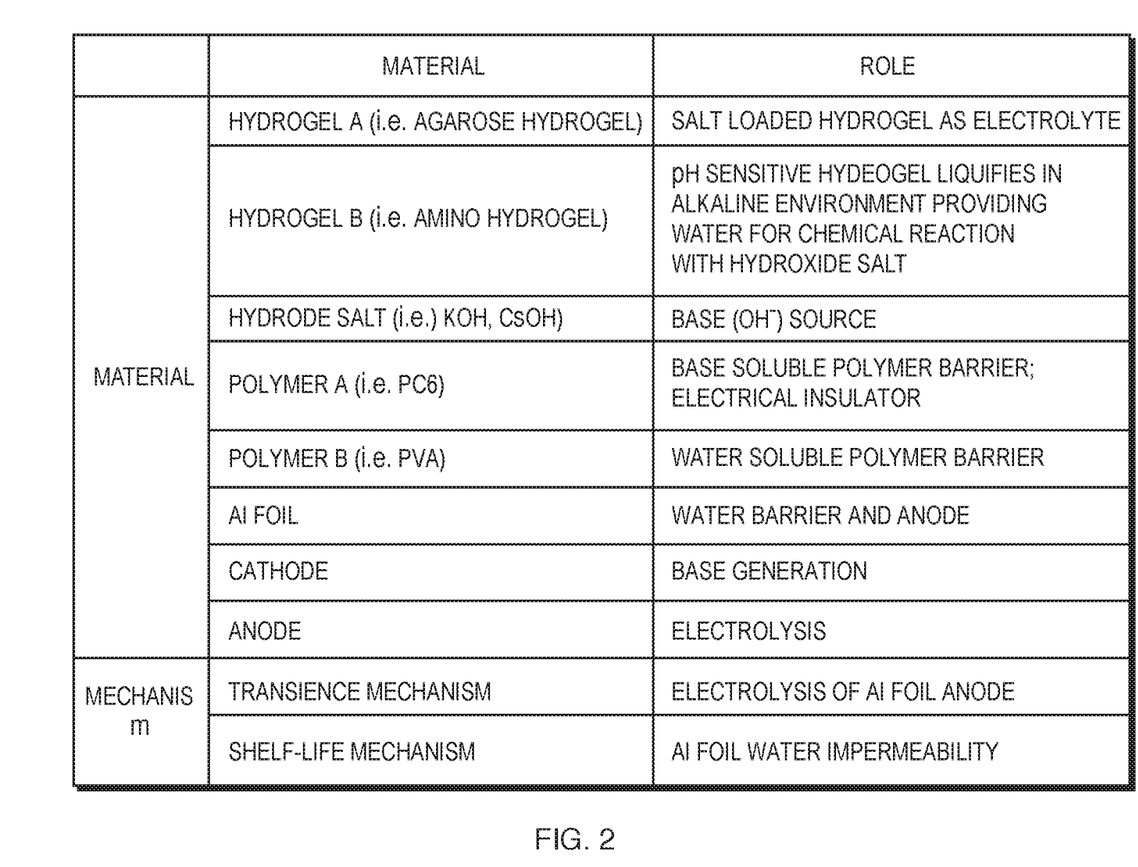
FIG. 2 shows a table detailing the materials and roles of one embodiment of a pHASE transient sensor.

In certain embodiments, the pHASE package consists of a hydrogel electrolyte (Hydrogel A), a pH-sensitive hydrogel (Hydrogel B) and a hydroxide salt (KOH, CsOH, etc.) separated by a material stack. In certain embodiments, the material stack comprises an aluminum foil and a base soluble water barrier polymer (Polymer A). In certain embodiments, an optional water soluble polymer (Polymer B) is used. Certain embodiments are shown in FIGS. 1 and 2. In some embodiments of the present disclosure, the aluminum foil serves as the primary impermeable barrier between the water containing hydrogel and the highly reactive hydroxide salt. In certain embodiments, the aluminum foil also acts as an anode with the base soluble polymer serving as an electrical insulator masking the aluminum anode on the hydrogel side. In certain embodiments, an aluminum cathode is also in contact with the hydrogel electrolyte, and is isolated from the anode with a layer of Polymer A.

Figure 3:
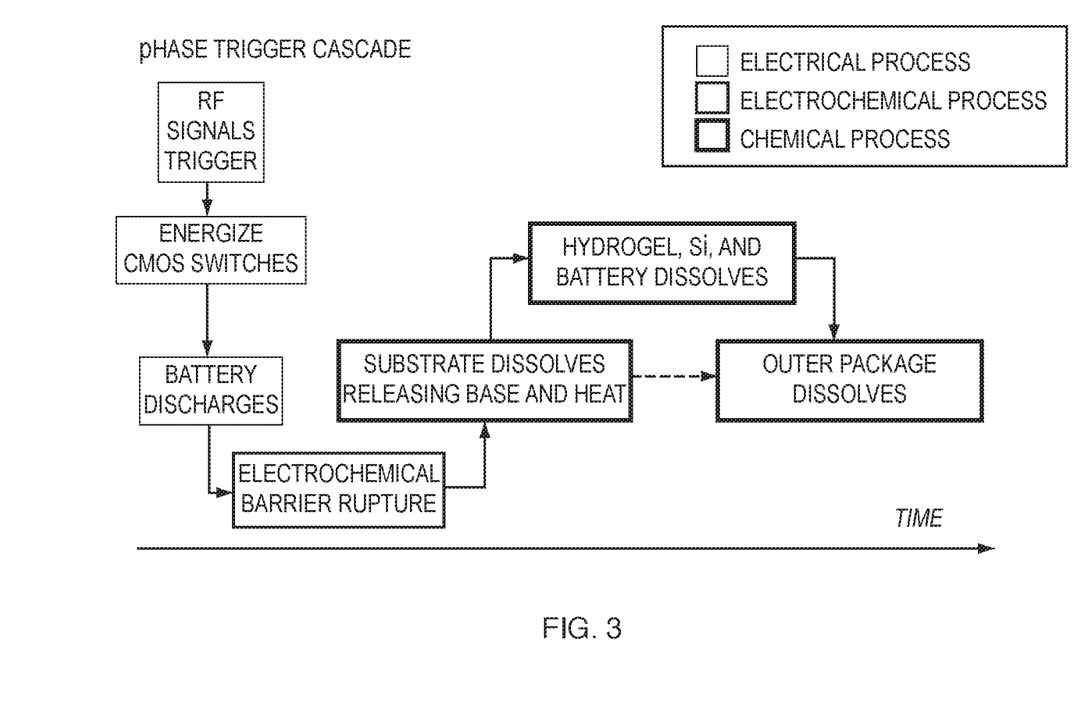
FIG. 3 shows one embodiment of the transience trigger event sequence using a remote RF trigger signal.

In certain embodiments, when transience is triggered, a voltage is applied and aluminum metal migrates from the anode aluminum water barrier to the cathode, thereby rupturing the aluminum barrier between the hydroxide salt across the anode and initiating the mixing of water from the hydrogel and the hydroxide salt for in-situ base generation. FIG. 3 shows one embodiment of the transience trigger event sequence initiated by a remote RF trigger signal.

According to an embodiment of the present disclosure, a method of destroying compromised objects comprises providing an object with an anti-tamper device, triggering an anti-tamper device, and making the object unusable through exposure to an alkaline solution. In certain embodiments, an anti-tamper device may be triggered through pressure, x-ray radiation, photon exposure, air flow, temperature, radio frequency, an electronic signal, and the like. The step of triggering may take place in the approximate area of the object. In certain embodiments, the step of triggering may take place remotely. In some embodiments, the triggering mechanism may be an electronic signal. In certain embodiments of the present disclosure, the electronic signal may be triggered through failed hardware authentication. In certain embodiments, authentication of the trigger is used to prevent unintended triggering events. The hardware authentication may be unauthorized data BUS probe detection, memory IC authentication, programmable logic methods, and the like.

In certain embodiments of the present disclosure, devices are adapted with the pHASE trigger mechanism. Upon triggering, the device begins a degradation process. In certain embodiments, the trigger is passive, e.g., internal detection of a tamper event. In certain embodiments, the trigger is active, e.g., remote triggering by RF when the technology has been determined to be lost or stolen. In one embodiment, the transience mode includes dissolution of a focal plane array (FPA) and/or other key electronics. In certain embodiments, a pressure trigger may react if an FPA is open. In certain embodiments, a micro-electrical mechanical systems (MEMS) sensor may be operated using a sub-threshold complementary metal-oxide-semiconductor (CMOS). In certain embodiments, the degradation process is deflagration. In certain embodiments, the degradation process is initiated through heat.

In certain embodiments, an x-ray trigger may react to an x-ray or an e-beam. In certain embodiments, the device may be manufactured such that e-beams and x-rays are not exposed passively to the trigger. In certain embodiments, the degradation process is dissolution of the device. In certain embodiments, the degradation is initiated through electrical means.

In certain embodiments, photonic triggers react to external light. In certain embodiments, the light triggers shattering. In certain embodiments, an air flow trigger may react when the device is opened. In certain embodiments of the present disclosure, humidity in the open air triggers the protected device to vaporize. In certain embodiments, a temperature trigger reacts to external probing with focused ion beam (FIB) resistive sensors. In certain embodiments, a chemical reaction initiates disconnection of the device. In certain embodiments, an RF trigger reacts to an external "destruct" command.

In certain embodiments, an external signal triggers the trigger remotely. In certain embodiments if an RF trigger is used, the RF trigger may also supply power to the device. In certain embodiments, the RF signal charges a storage capacitor or battery. In certain embodiments, it is tuned with UHF RFID. In certain embodiments, hardware authentication determines if a device is compromised. In Table 1, certain triggers are shown as associated with sensing methods:

| Triggers | Sensing | Application |
|---|---|---|
| Pressure | Activated when FPA is open | MEMS sensor operated using sub-threshold CMOS |
| X-ray/Radiation | Reacts to X-ray and e-beam exploration without opening camera | Power photodiode, generate wireless signal. |
| Photons | Reacts to external light when camera is open | Power photodiode, generate wireless signal. |
| Air Flow | Activated when camera is open | MEMS sensor operated using sub-threshold CMOS |
| Temperature | Respond to external probing with FIB | Resistive sensor operated using sub- |

| Triggers | Sensing | Application |
| --- | --- | --- |
| RF | Activated upon receiving destruction command | threshold CMOS Communication using sub-threshold CMOS |

In certain embodiments, a mesh network of small covert wireless sensors provide denied access situational awareness in which network compromise is circumvented with triggered transience technology. In certain embodiments, the pHASE, sensor physically disappears in a controlled, triggerable manner. In certain embodiments, sensors and data processing conserve energy by remaining unpowered until an antenna receives an interrogation signal from a remote transceiver. In certain embodiments, the signal supplies power to the sensors, which register the local environmental status and transmit back to the remote transceiver. In certain embodiments, the interrogation signal also supplies power to maintain charge in a pre-charged dual cell supercapacitor or battery, which is used to trigger transience upon command.

Figure 4:
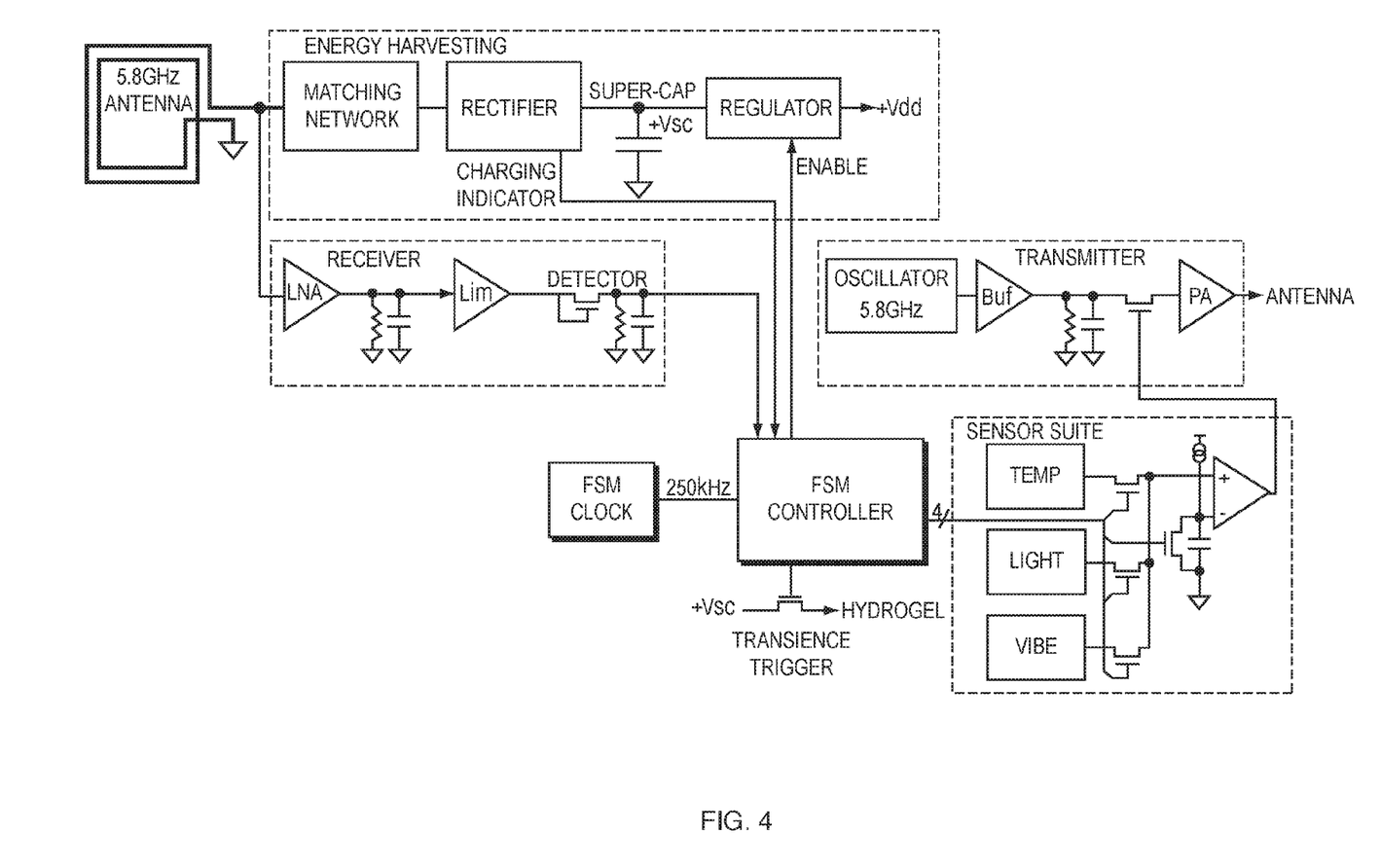
FIG. 4 shows a circuit block diagram of one embodiment of vanishing pHASE sensor of the present disclosure.
Figure 5:
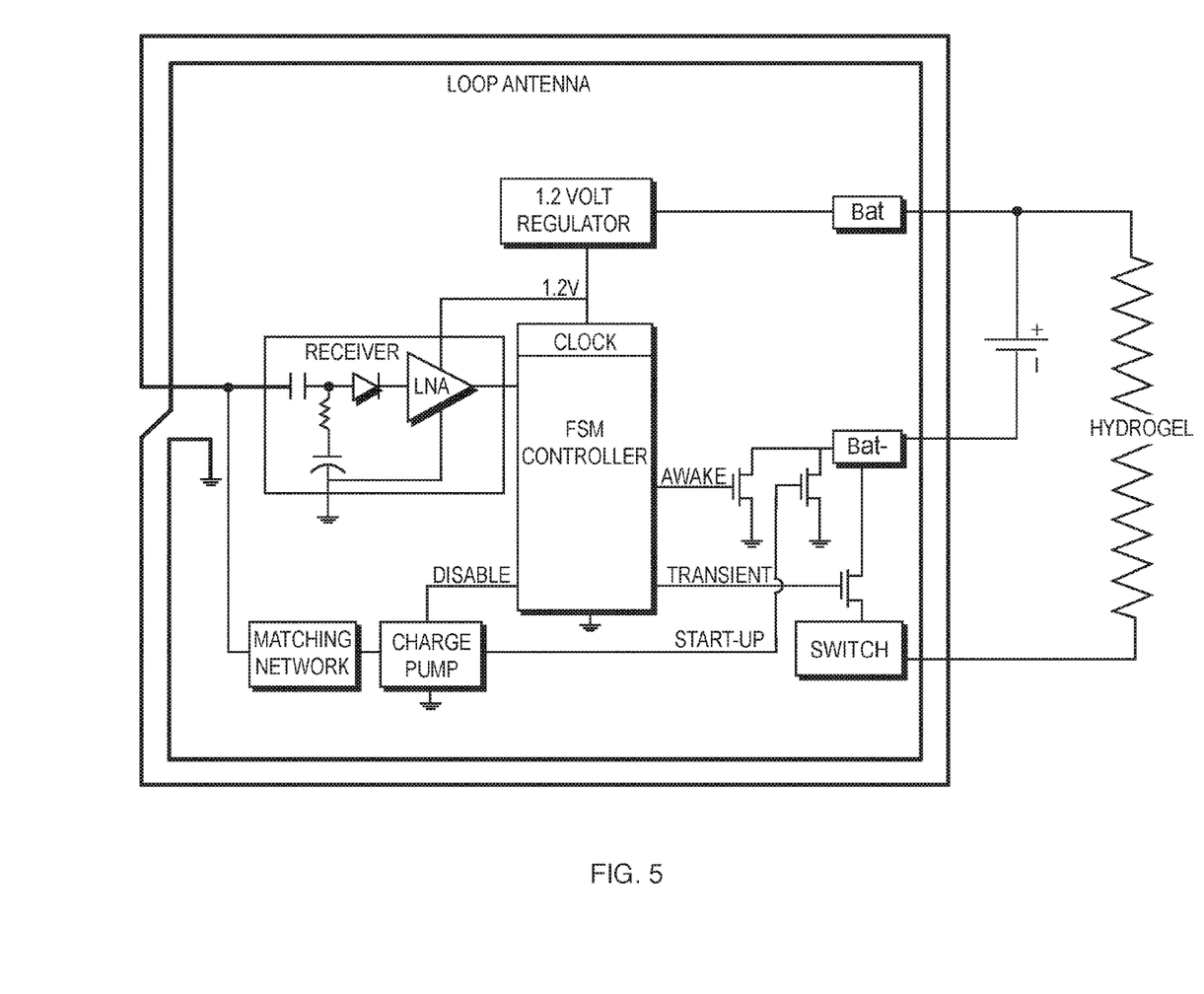
FIG. 5 shows one embodiment of a pHASE RF sensor layout of the present disclosure.

In certain embodiments of the present disclosure, to measure the environmental anomalies associated with targeted activities under surveillance, the core of the sensor contains light, temperature, and vibration sensors, data processing, an RF antenna, RF power scavenging, and/or a dual cell supercapacitor with power management circuitry as shown in FIGS. 4 and 5.

In certain embodiments, a pHASE sensor (FIG. 4) contains three environmental sensors: temperature, light, and vibration. Power for sensing and communication can be harvested from the RF signal and used for readout interrogation. In certain embodiments, the transient supercapacitor or battery is pre-charged and delivers the power necessary for chemical reactions. In some embodiments, communication, data processing, and power management circuit blocks are also included. All of the components may be fabricated using modified SOI (Silicon-on-Insulator) processing techniques, which may utilize a hydrogel packaging material. The entire SOI circuit die can be coated with a water soluble polymer and be mechanically supported by a hydroxide salt substrate. In certain embodiments, a key feature is that the entire sensor is built from materials that dissolve under strongly basic conditions (>pH 13).

Figure 6:
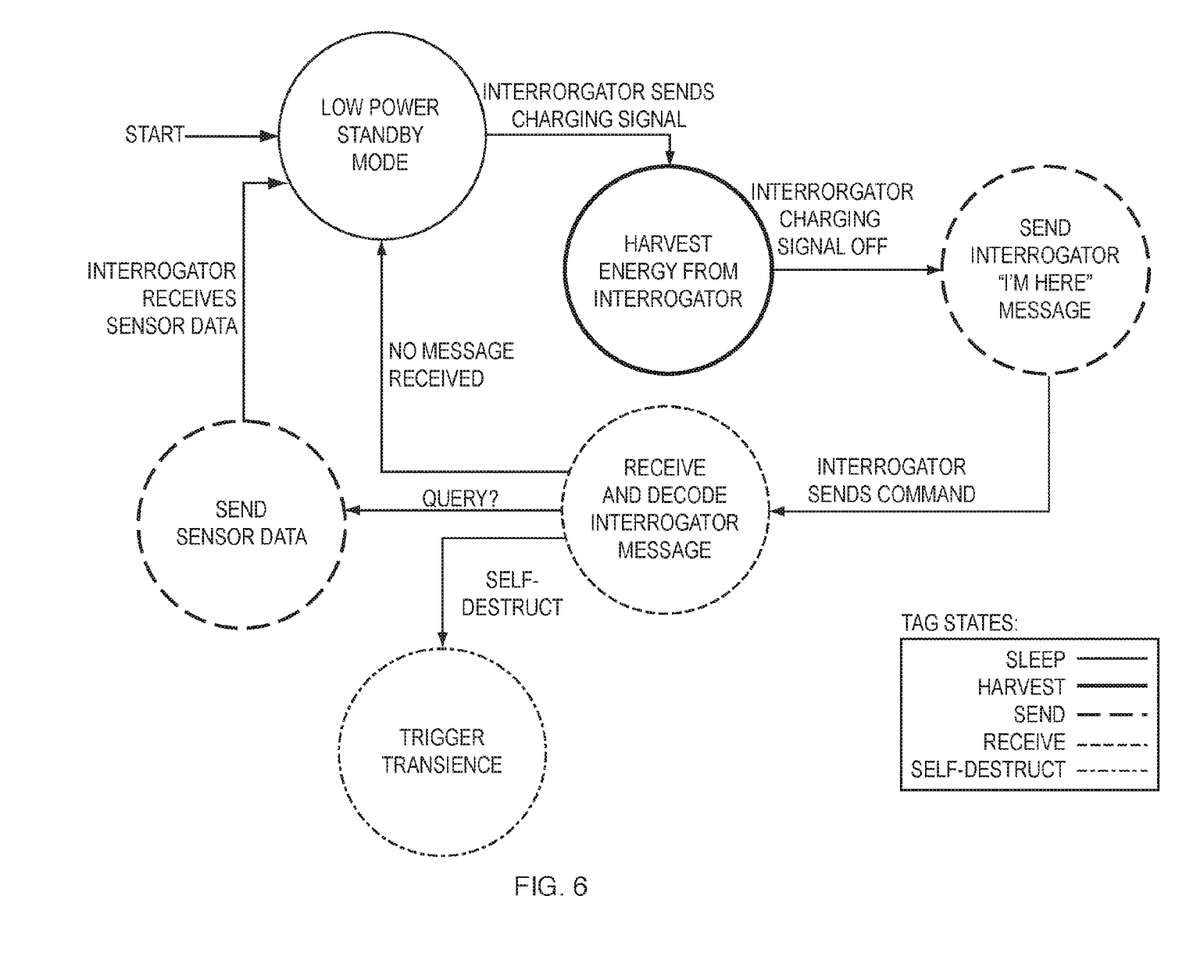
FIG. 6 shows one embodiment of a low-power communication scheme between an interrogator (transceiver) and pHASE sensor using RF energy harvesting.

A low-power communication scheme between an interrogator (transceiver) and pHASE sensor is shown in FIG. 6. In certain embodiments, operation begins with the transceiver supplying continuous-wave (CW) energy to be harvested by the transient sensor. In certain embodiments, when the transceiver wishes to obtain sensor status, it stops sending the CW signal. The sensor detects this change in transceiver state and sends out an "I'm here" message, and then goes into receive mode. This begins a handshake sequence with the transceiver. In certain embodiments, the transceiver detects the sensor's presence and sends back a coded message. In certain embodiments, two types of messages can be sent, one that triggers transience and one that requests sensor data. When a "self-destruct" message is sent, the sensor releases its supercapacitor energy into the hydrogel, beginning the reactions to dissolve the chip. In certain embodiments, strict power management is maintained through the Finite State Machine (FSM) sequence, with functions powered up only as needed.

In certain embodiments, the overall circuit architecture of the transient wireless sensor required to execute low-power communication is presented in FIG. 4. More specifically, there are separate circuit blocks to implement energy harvesting, the RF data link, and environmental sensing. In certain embodiments, a sensor voltage to RF pulse width circuit encodes sensor values in a returned message. In certain embodiments, an on-chip 250 kHz clock provides timing for the FSM controller to meet timing requirements while keeping logic power low. In certain embodiments, the transmitter utilizes a separate 5.8 GHz oscillator that is enabled only when returning sensor data.

In certain embodiments, the system layout (FIG. 5) shows all of the circuit blocks located inside the loop antenna. In certain embodiments, the rectifier circuit is a key block in harvesting RF energy. In certain embodiments, a threshold-compensated Dickson charge pump topology is used. This topology mitigates the effects of gate threshold voltage $V_{th}$ and greatly improves rectification efficiency at low power levels. In certain embodiments, a matching network enhances efficiency by matching the antenna's low impedance to high rectifier impedance. This approach can attain net efficiencies of >10%, minimizing charging times.

Figure 8:
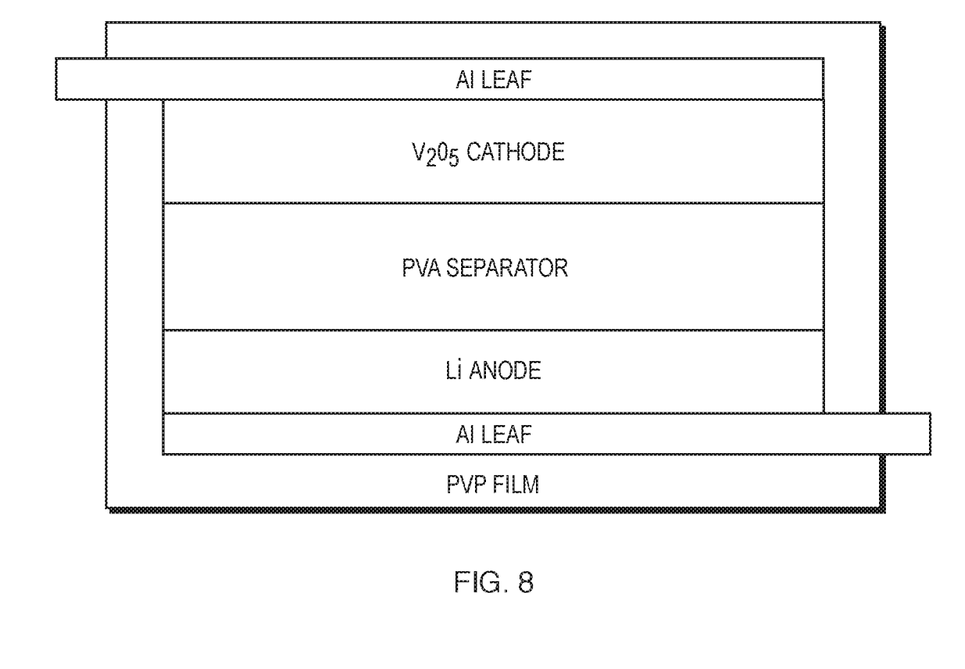
FIG. 8 shows an embodiment of a base dissolvable battery design used as an on-board power source to trigger pHASE sensor transience.

In certain embodiments, the power circuits utilize a transient battery as shown in FIG. 8. This base dissolvable battery consists of a cathode made of $V_2O_5$ nanofiber, Carbon nanotubes (CNT), and polyvinylpyrrolidone (PVP) as a slurry coating on an aluminum electrode. In certain embodiments, the separator consists of a PVP membrane. In certain embodiments, the anode consists of lithium metal. In some embodiments, the battery has aluminum foil current collectors and a protective polyvinyl acetate (PVA) film encapsulation.

In certain embodiments, the electrically triggered hydrogel which initiates self-destruction of the sensor can also be used as a vibration sensor at no additional system cost. Piezoresistive coefficients of hydrogels are about the same as in the thin metal wires typically used in commercial off-the-shelf (COTS) piezoresistive vibration sensors. In both cases $\Delta R/R=2\Delta L/L$, where R is resistance and L is sensor length.

Figure 7:
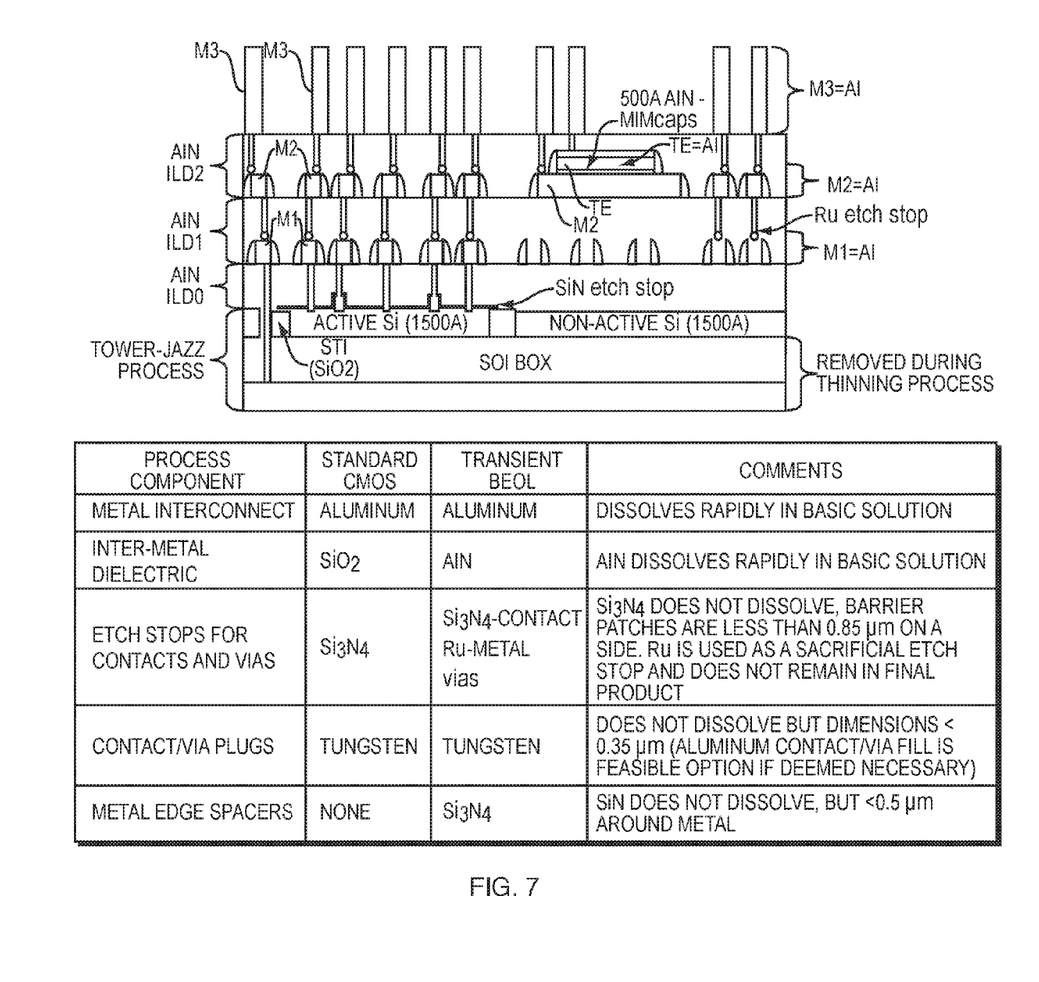
FIG. 7 shows an embodiment of material substitutions required to render the silicon electronics base dissolvable.

In certain embodiments, the transient materials used in the electronic circuitry are mainly thin silicon (Si), aluminum (Al) and aluminum nitride (AlN) as opposed to the Si, copper, and silicon oxide used in a typical CMOS process as shown in FIG. 7. In certain embodiments, the circuits are processed on standard SOI wafers at a commercial CMOS foundry. In certain embodiments, Aluminum Nitride (AlN) replaces $SiO_2$ in the isolation stack to improve base dissolution rates, while aluminum (Al) is used as the source and drain metal.

In certain embodiments, triple-well isolated, low threshold voltage negative channel field effect transistors (nFET) are used in the rectifier circuit, allowing static body-source connection to reduce body effect. In certain embodiments, thinning of the pHASE sensor die enhances base dissolution and has minimal impact on isolated rectifier FETs, as the deep isolation nwell shields the die from substrate effects, and the thinned die will still be much thicker than the nwell. In certain embodiments, a 250 mV gate threshold voltage is used for rectifier nFETs. This is an optimal compromise between off-state leakage of lower threshold devices and increased RF signal level needed for higher threshold devices. Increased off-state leakage current of low-Vth devices bleed off harvested energy, degrading efficiency. Similarly, high-Vth devices may have very low off-state leakage, but they require larger RF signals, degrading energy harvesting efficiency at low power levels.

In certain embodiments, the scavenged RF power is used to maintain charge of the dissolvable, solid state supercapacitor or battery, which is stacked on top of the SOI. In the event of a signaled self-destruct, the charge maintained in the supercapacitor or battery is discharged to initiate transience.

In certain embodiments, hydrogel triggered by an electrical signal is used to activate self-destruction of the sensor. In certain embodiments, the piezoresistive effect in the hydrogel is used as a vibration sensor at no additional system cost. Piezoresistive coefficient in hydrogels is about the same as in thin metal wires, which are typically used in COTS piezoresistive vibration sensors. In both cases, $\Delta R/R = 2\Delta L/L$ where R is resistance and L is sensor length. Therefore, expected performance of the hydrogel vibration sensor is approximately equal to performance of similar COTS sensors based on elastomeric wires. In certain embodiments, utilization of the package as a vibration sensor achieves the largest possible sensor size, thus achieving the largest possible vibration sensitivity. Since typical vibration frequencies $\omega$ of buildings and ground are located in the 1-10 Hz range, vibration sensitivity of the sensor is defined by its lowest mechanical eigenfrequency $\omega_0$; vibration amplitude A of a sensor is proportional to $$A \sim \frac{1}{\omega_0^2 - \omega^2} \sim \frac{1}{\omega_0^2}.$$

Therefore, in order to achieve similar sensitivity, a separate vibration sensor would need to have about the same size as the pHASE package, resulting in considerably increased pHASE sensor size. In certain embodiments, sensitivity of the hydrogel vibration sensor was evaluated as follows: hydrogel resistance changes linearly as a function of strain up to very large strains $\Delta L/L \sim 25\%$ in the frequency range from zero up to its lowest mechanical eigenfrequency, which can be estimated from the speed of sound in the hydrogel (roughly the same as water, or ~343 m/s). In certain embodiments, for a 5 mm sensor the lowest mechanical eigenfrequency appears to be 68 kHz. Therefore, the gauge factor of hydrogel at frequencies below 68 kHz is about 2, independent of frequency. Pressure variations in the 5 mm×5 mm×5 mm hydrogel sample experiencing sinusoidal motion with 0:1 G peak acceleration were estimated as follows: the hydrogel mass is m ~0.125 g given density close to the density of water=1 g/cm$^3$. The force oscillating with 0.1 G amplitude causes inertial force oscillations on the order of $F=0.1$ mG about $1.25 \times 10^{-4}$ N. The resulting pressure oscillation inside hydrogel is $P=F/(5 \text{ mm})^2$ about 5 Pa. The Young's modulus of hydrogel is very low: about 1 kPa meaning that 5 Pa pressure oscillations produce about 0.5% elongation of the hydrogel sensor leading to easily detectable 1% oscillations of its resistance. Since the vibration sensor relies on changes of its impedance, it was used without modification in the passive RF ID scheme.

In certain embodiments, integrated circuitry are designed and built using SOI, including transistors, inductors, resistors, metal oxide semiconductor capacitors (MOSCaps) and photodiodes. A CMOS compatible process was used to fabricate the transient layers. A schematic of one embodiment of the transient transistor stack is shown in FIG. 7. Many of the materials used in the standard CMOS foundry are not transient in alkaline solution. In certain embodiments, to achieve transience while maintaining the electrical performance, selected transient materials met following criteria: i) CMOS compatible; ii) least electrical performance degradation; iii) rapidly soluble in alkaline solution. In certain embodiments, the best candidate material for interconnects was aluminum, which met all the criteria and is widely used in existing CMOS foundries. Almost all dielectric materials are insoluble in alkaline solution, including all the low-K dielectrics currently used in standard CMOS process. However, AlN is CMOS compatible, with good electrical performance and transience. Recent work also showed that AlN can be manufactured on 200 mm production lines. Both Al and AlN dissolve slowly in alkaline solution at room temperature, but the dissolution rate increases dramatically with increasing temperature. In certain embodiments, at 60° C., the dissolution rate for AlN reached 0.6 μm/min for as-deposited AlN or AlN annealed at 500° C. In certain embodiments, a film thickness of 0.3 μm dissolved in about 30 s.

In certain embodiments, the electrical performance of silicon electronics using transient materials was simulated above. The transient materials used to build transistors (e.g., thin silicon AlN dielectric, polysilicon, and aluminum interconnect) were used to build transistors, inductors, MOSCaps and photodiodes. In certain embodiments, of all the components in the integrated circuitry, the transistor process was the most complicated. In certain embodiments, by replacing the interconnect and interlayer dielectric (ILD) with transient materials and eliminating non-transient tungsten, the transistor became compatible with the present transience scheme, while using existing CMOS foundry tool sets.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of destroying compromised objects, comprising:
    providing an electronic device having electronic circuitry comprising thin silicon (Si), aluminum (Al) or aluminum nitride (AlN);
    providing a first reagent;
    providing a second reagent;
    providing a barrier between the first and second reagents, the barrier having a first reagent side and a second reagent side;
    triggering destruction of the barrier;
    generating a base by combining the first and second reagents; and
    dissolving at least a portion of the electronic circuitry in the electronic device thereby making the electronic device unusable.

2. The method of claim 1, wherein the step of triggering takes place remotely.

3. The method of claim 2, wherein the triggering mechanism is an electronic signal.

4. The method of claim 1, wherein the first reagent is a hydrogel electrolyte and the second reagent is a hydroxide salt.

5. The method of claim 1, wherein the barrier between the first and second reagents comprises a material stack comprising an aluminum foil and a base soluble, water barrier polymer.

6. The method of claim 5, wherein the aluminum also acts as an anode, with the base soluble, water barrier polymer serving as an electrical insulator masking the aluminum anode on the first reagent side.

7. The method of claim 6, wherein the step of triggering destruction of the barrier comprises applying a voltage causing aluminum ions to migrate from the aluminum anode to a cathode electrode, thereby rupturing the barrier between first reagent and the second reagent.

* * * * *